United States Patent [19]

Mandrin

[11] 4,234,553

[45] * Nov. 18, 1980

[54] PROCESS AND APPARATUS FOR THE PREPARATION OF AMMONIA AND HEAVY WATER

[75] Inventor: Charles Mandrin, Winterthur, Switzerland

[73] Assignee: Sulzer Brothers Limited, Winterthur, Switzerland

[ * ] Notice: The portion of the term of this patent subsequent to Jul. 22, 1997, has been disclaimed.

[21] Appl. No.: 796,308

[22] Filed: May 12, 1977

[30] Foreign Application Priority Data

May 13, 1976 [CH] Switzerland .......................... 6019/76

[51] Int. Cl.³ .............................................. C01C 1/04
[52] U.S. Cl. .................................... 423/359; 422/148; 422/189
[58] Field of Search ............... 423/359, 360, 351, 361, 423/362, 363, 580 H, 648 A, 441; 48/216, 217; 422/148, 189

[56] References Cited

U.S. PATENT DOCUMENTS

| | | | |
|---|---|---|---|
| 2,180,206 | 11/1939 | Honnef | 208/10 |
| 3,215,503 | 11/1965 | Nessler | 423/351 |
| 3,716,623 | 2/1973 | Bancroft | 423/648 A |
| 4,112,062 | 9/1978 | Spevack | 423/580 H |

FOREIGN PATENT DOCUMENTS

| | | | |
|---|---|---|---|
| 975136 | 9/1975 | Canada . | |
| 867736 | 5/1961 | United Kingdom | 423/580 H |

OTHER PUBLICATIONS

Arco & Gas, 1961, II(3–4), pp. 18–29.
Miller, Acetylene, 1965, pp. 260–263, 270–271.
Summers, Scientific American, 1971, vol. 224, No. 3, pp. 157–158.

*Primary Examiner*—Wayne A. Langel
*Attorney, Agent, or Firm*—Kenyon & Kenyon

[57] ABSTRACT

To reduce the consumption of electricity, a portion of the deuterium-enriched water is stored during the winter while the remainder is used to produce hydrogen in the heavy water preparation plant. The stored deuterium-enriched water is then used in the summer with fresh water to produce hydrogen in the electrolyzer for delivery to the ammonia synthesizing plant. Surplus hydrogen is stored during the summer for subsequent use in the synthesizing plant during the next winter.

6 Claims, 1 Drawing Figure

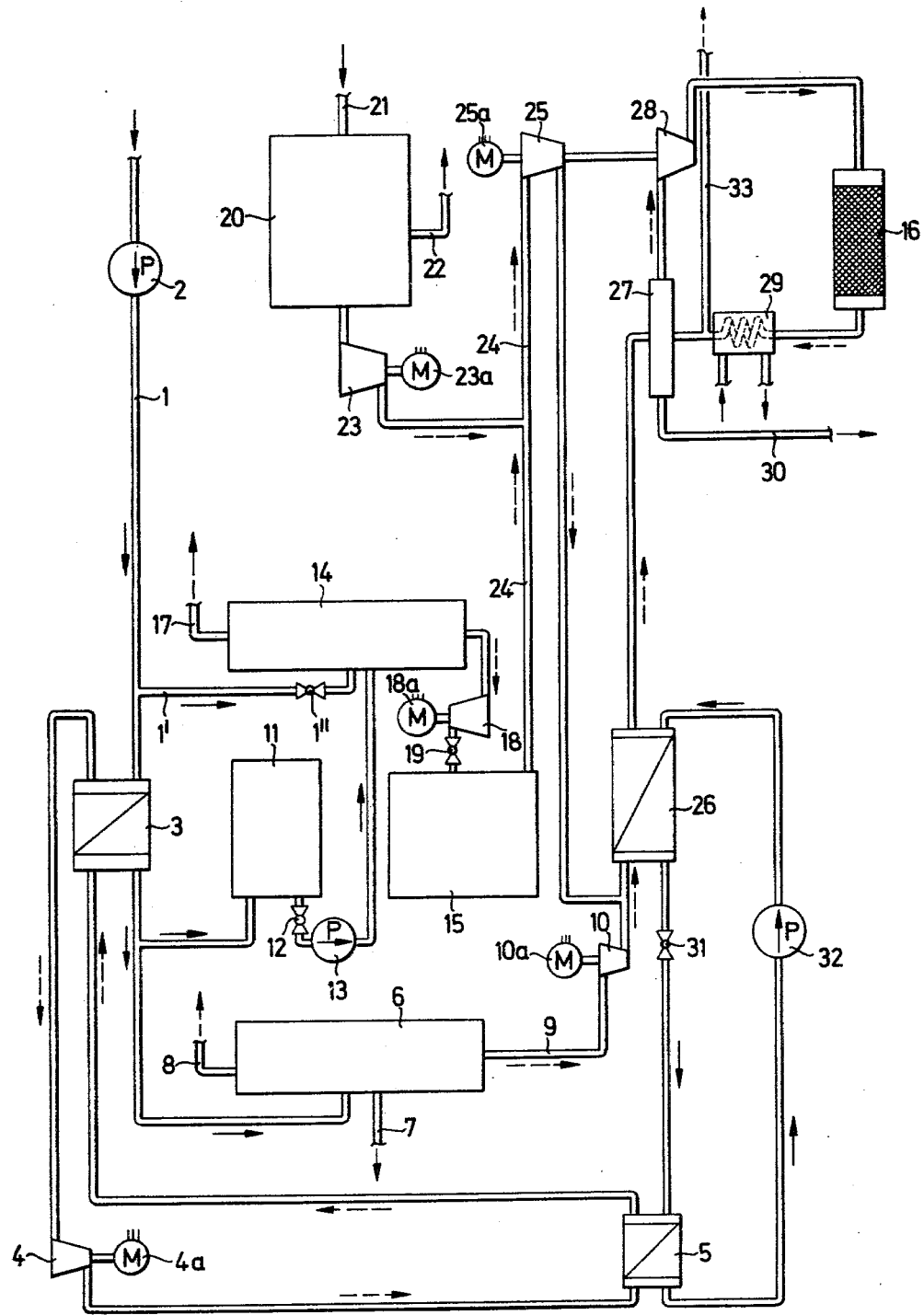

PROCESS AND APPARATUS FOR THE PREPARATION OF AMMONIA AND HEAVY WATER

This invention relates to a process and apparatus for the preparation of ammonia and heavy water.

As is known, ammonia is usually produced continuously throughout the year in synthesizing plants. Further, in order to reduce the cost associated with such plants, it has been known to combine a heavy water preparation plant with the synthesizing plant. Generally, these combined plants use isotope exchange towers to enrich a supply of feed water with deuterium for the production of heavy water as well as an electrolyzer to produce hydrogen for use in the ammonia synthesis.

However, the operation of such plants involves a relatively heavy consumption of electricity. Thus, since electricity is usually more expensive in winter than in summer, when electricity consumption drops considerably, e.g. because there is no need to heat buildings, a suggestion has been made to shut down the electrolyzer during the winter and to have the electrolyzer produce surplus hydrogen in the summer, the surplus being stored to cover the winter consumption of the ammonia synthesizing plant.

Unfortunately, this means that the heavy water production plant is also inoperative in the winter since there is no feed water available for the isotope exchange towers.

Further, each isotope exchange tower and the electrolyzer must be constructed to deal with correspondingly increased throughputs since they are in use for only some, e.g. six months of each year.

The existing apparatus thus has serious economic disadvantages.

Accordingly, it is an object of the invention to provide a process and apparatus providing continuous production of ammonia and heavy water much more cheaply than is presently the case.

It is another object of the invention to reduce the overall consumption of electricity in an apparatus for the preparation of ammonia and heavy water.

It is another object of the invention to provide a relatively simple system for reducing the cost of producing ammonia and heavy water.

Briefly, the invention provides a process and apparatus for the preparation of ammonia and heavy water wherein deuterium-enriched water is stored during the winter (i.e. the colder half of a year) and used to produce hydrogen for storage in the summer (i.e. the warmer half of a year).

In accordance with the process, a flow of nitrogen is generated for delivery to a synthesizing plant and a flow of water is enriched with deuterium during the winter whereas, during the summer, only a part of the water flow is enriched with deuterium with the remainder being electrolytically dissociated. A first portion of the deuterium enriched water is then supplied to a heavy water preparation plant to produce heavy water and hydrogen with the hydrogen being supplied to the synthesizing plant. A second portion of the deuterium enriched water is stored during the winter and is subsequently electrolytically dissociated during the summer to form hydrogen. A portion of the electrolytically produced hydrogen is then stored during the summer while the remainder is supplied to the synthesizing plant. Subsequently, the stored hydrogen is supplied to the synthesizing plant during the winter.

The apparatus of the invention comprises a nitrogen-producing means for generating a flow of nitrogen, a monothermal isotope exchanger for enriching water of a natural deuterium concentration with deuterium, a heavy water preparation plant for preparing heavy water from a portion of the deuterium enriched water and an electrolyzer for electrolytically dissociating water to produce hydrogen. In addition, the apparatus includes an enriched-water storage tank for storing a second portion of the deuterium-enriched water during winter operation. This tank is selectively connected to the electrolyzer to deliver stored deuterium-enriched water to the electrolyzer during summer operation. Also, the apparatus has a hydrogen storage tank which is selectively connected to the electrolyzer to receive hydrogen which is produced in the electrolyzer as well as an ammonia synthesizing plant for receiving a synthesis gas mixture of nitrogen from the nitrogen producing means and hydrogen from the heavy water preparation plant and hydrogen storage tank.

The monothermal isotope exchanger has a first exchange tower for a throughflow of the water and a first circuit for passing a deuterium containing vapor vehicle through the exchange tower in isotope exchange with the water in order to enrich the water with deuterium. Also, the exchanger has a second exchange tower for a throughflow of the synthesis gas mixture and a second circuit for passing a liquid vehicle through the second exchange tower in isotope exchange with the synthesis gas mixture in order to remove deuterium from the synthesis gas mixture while enriching the liquid vehicle with deuterium. Still further, the exchanger has a third exchange tower for counterflow of the vapor vehicle and liquid vehicle therein in isotope exchange relation in order to deplete the liquid vehicle of deuterium while enriching the vapor vehicle with deuterium. In one embodiment, the vapor vehicle is ammonia vapor while the liquid vehicle is liquid ammonia. In another embodiment, the vapor vehicle may be methylamine vapor while the liquid vehicle is liquid-methylamine.

These and other objects and advantages of the invention will become more apparent from the following detailed description and appended claims taken in conjunction with the accompanying drawings in which:

The drawing illustrates a flow diagram of an apparatus according to the invention.

Referring to the drawing, the apparatus for the production of ammonia and heavy water comprises a feed water line 1 in which a pump 2 is incorporated for pumping feed water into and through an exchange tower 3 of a monothermal isotope exchanger of the apparatus. As shown, the monothermal isotope exchanger has a circuit for passing a deuterium-containing vapor vehicle, such as ammonia vapor or methylamine vapor through the exchange tower 3 in isotope exchange with the water in order to enrich the water with deuterium. The vapor vehicle is circulated via a compressor 4 which is driven by an electric motor 4a and also passes through a further exchange tower 5 for purposes as described below.

A heavy water preparation system 6 is connected via a suitable pipe line to the exchange tower 3 in order to receive the deuterium-enriched water. This heavy water preparation system 6 is constructed in known manner in order to form heavy water which exits through a line 7. For instance, the system 6 includes an electrolyzer (not shown) in which the enriched water is dissociated, a condensor wherein the further deuterium-enriched water vapor present in the hydrogen is separated out and condensed, and a suitable rectification means wherein the separated enriched water is recitified in order to be concentrated to form heavy water. The oxygen which is evolved in the heavy water preparation system 6 exits through a line 8 whereas the hydrogen evolved is passed out of a pipe 9 to flow to a compressor 10 which is driven by an electric motor 10a.

The apparatus also includes an enriched water storage tank 11 which is connected to the exchange tower in order to receive a flow of deuterium enriched water. The tank is also connected via a line containing a valve 12 and a pump 13 with an electrolyzer 14 of known construction. The electrolyzer 14 is also connected via a line 1' containing a valve 1" to the feed water line 1 in order to selectively receive fresh feed water.

The electrolyzer 14 is also connected to a hydrogen storage tank 15 via a compressor 18 which is driven by a motor 18a and a valve 19 between the compressor 18 and the tank 15. Also, the electrolyzer has a line 17 from which oxygen which is evolved during a dissociation step exits, for example to a load (not shown).

The apparatus also includes a nitrogen producing means such as an air dissociation system 20 for generating a flow of nitrogen. For this purpose a line 21 delivers air to the dissociation system 20. Oxygen which is evolved in the system is removed through a line 22 while the nitrogen which evolves is pumped via a compressor 23 which is driven by an electric motor 23a to a synthesizer gas line 24. This line 24 is also connected to the hydrogen storage tank 15 to receive a flow of hydrogen gas. The downstream end of the line 24 is connected to a compressor 25 which is driven by an electric motor 25a for compressing the synthesis gas mixture which consists mainly of hydrogen and nitrogen. The compressed gas mixture is then delivered to an exchange tower 26 of the monothermal isotope exchanger along with a flow of hydrogen gas from the compressor 10.

The exchange tower 26 is connected via a suitable line to a drip separator 27 which, in turn, is connected via a line to a compressor 28 driven from the motor 25a. The compressor 28 communicates with an ammonia synthesizing plant 16 in which the synthesis gas mixture is synthesized into ammonia. The outlet of the synthesizing plant 16 is connected to a cooler 29 in which the produced ammonia is condensed via a heat exchanger with a suitable coolant. A suitable pipe is provided for passing the condensed ammonia through the drip separator 27 and out a product line 30. In addition, a branch line 33 is provided for drawing off a small quantity of a product consisting of nitrogen, hydrogen and argon in order to prevent argon enrichment in the synthesizing plant 26.

As shown in the drawing, the exchange tower 26 cooperates with a circuit for passing a liquid vehicle through the tower 26 in isotope exchange with the synthesis gas mixture in order to remove deuterium from the synthesis gas mixture while enriching the liquid vehicle with deuterium. This circuit includes a valve 31 for controlling the throughflow of the liquid vehicle and a pump 32 for pumping the vehicle through the tower 26. In addition, the liquid vehicle is pumped through the exchange tower 5 in counterflow to the vapor vehicle described above so as to bring about an isotope exchange relation between the two vehicles in order to deplete the liquid vehicle of deuterium while enriching the vapor vehicle with deuterium.

In operation, the apparatus operates as follows in the summer the warmer half of the year:

Fresh water having a natural deuterium concentration (1 N) is fed into the system through the feed water line 1. The pump 2 pressurizes the water to the pressure required in the monothermal isotope exchanger, thereafter the water flows through the exchange tower 3. The water is then enriched with deuterium in the tower 3 by deuterium exchange with the vapor vehicle circulating through the towers 3, 5.

A portion of the enriched water then enters the heavy water preparation system 6 and is concentrated to form heavy water in known manner. The heavy water then leaves the system 6 via the line 7 while oxygen leaves via the line 8 and hydrogen leaves via the line 9. The hydrogen is then compressed to the required pressure in the compressor 10 and passed into the synthesizing gas piping.

The remainder of the water which has been enriched in the tower 3, such remainder being considerably greater than the quantity of water ejected into the heavy water preparation system 6, passes to the water storage tank 11. During the summer, the valve 12 is opened so that the water is pumped via the pump 13 to the electrolyzer 14. While the electrolyzer 14 is operating, fresh water is also fed in via the line 1', assuming the valve 1" is opened.

The oxygen which is evolved in the electrolyzer 14 is then passed through the line 17 and supplied to a load (not shown) while the hydrogen is compressed in the compressor 18 and fed into the hydrogen storage tank 15 through the opened valve 19. A part of this hydrogen is then passed into the synthesis gas line 24.

The quantity of nitrogen required for the ammonia synthesis plant is produced continuously throughout the year in the air dissociation system 20. In this regard, air enters the system 20 through the line 21 and is dissociated therein. The evolved oxygen is removed through the line 22 while the produced nitrogen is pumped via the compressor 23 to the gas line 24 and mixed with the hydrogen from the hydrogen storage tank 15. The synthesis gas consisting mainly of the supplied nitrogen and hydrogen is then compressed in the compressor 25 and pumped to the isotope exchange tower 26 along with the hydrogen supplied from the heavy water preparation plant 6. The resultant synthesis gas mixture is then deuterium-depleted in the tower 26 by isotope exchange with the liquid vehicle, for example, liquid ammonia or liquid methylamine and is then introduced into the drip separator 27. The gas mixture is then pumped via the compressor 28 into the synthesizing plant 16. The ammonia which is produced is then condensed in the cooler 29 and leaves the system through a product line 30.

After deuterium enrichment in the tower 26, the liquid vehicle is expanded in the throttle valve 31, thereafter deuterium-depleted in the exchange tower 5 by isotope exchange with the vapor vehicle and thereafter pumped by the pump 32 to the correct operating pressure for the tower 26 and again deuterium-enriched therein.

The operation of the apparatus during the winter the colder half of the year is as follows:

First, the valve 1" in the line 1' to the electrolyzer 14 is closed, the valve 12 from the water storage tank 11 is closed and the valve 19 to the hydrogen storage tank 15 is closed. Also, the electrolyzer 14 is deactivated.

Thereafter, all of the feed water in the line 1 passes through the exchange tower 3 and is deuterium enriched. A portion of the deuterium-enriched water is then passed to the heavy water preparation plant 6 while a second portion of the enriched water is passed into the water storage tank 11 for storage purposes. The tank 11 is filled up with enriched water in the amount necessary to produce the quantity of hydrogen which is stored in the tank 15 during the next summer.

The nitrogen required for the synthesizing plant 16 is produced as above and delivered into the gas line 24 along with the hydrogen which was stored the previous summer in the tank 15. The synthesis gas mixture is then compressed in the gas compressor 25 and passed into the exchange tower 26 along with the hydrogen from the heavy water preparation plant 6. Operation then proceeds in the synthesizing plant 16 as described above.

It is to be noted that during the six summer months, the electrolyzer 14 operates to produce twice the amount of hydrogen by dissociation from enriched water, required by the ammonia synthesizing plant 16 in a six month period.

Further, during the summer, an equal quantity of water from the water storage tank 11 is dissociated in the electrolyzer 14 as is fed in said storage tank from the tower 3.

What is claimed is:

1. An apparatus for the production of ammonia and heavy water comprising
    a nitrogen-producing means for generating a flow of nitrogen;
    a monothermal isotope exchanger for enriching water of a natural deuterium concentration with deuterium;
    a heavy water preparation plant connected to said exchanger for receiving a portion of the deuterium-enriched water and preparing heavy water therefrom;
    an electrolyzer for electrolytically dissociating water to produce hydrogen;
    an enriched-water storage tank connected to said exchanger for receiving and storing a second portion of the deuterium-enriched water, said tank being selectively connected to said electrolyzer to deliver stored deuterium-enriched water to said electrolyzer;
    a hydrogen storage tank selectively connected to said electrolyzer to receive hydrogen produced in said electrolyzer; and
    an ammonia synthesizing plant connected to said nitrogen producing means and connected to said heavy water preparation plant and said hydrogen storage tank for receiving a synthesis gas mixture of nitrogen from said nitrogen producing means and hydrogen from said heavy water preparation plant and said hydrogen storage tank.

2. An apparatus as set forth in claim 1 wherein said monothermal isotope exchanger includes a first exchange tower for a throughflow of water, a first circuit for passing a deuterium containing vapor vehicle through said exchange tower in isotope exchange with the water to enrich the water with deuterium, a second exchange tower for a throughflow of the synthesis gas mixture, a second circuit for passing a liquid vehicle through said second exchange tower in isotope exchange with the synthesis gas mixture to remove deuterium from the synthesis gas mixture while enriching the liquid vehicle with deuterium, and a third exchange tower for counterflow of the vapor vehicle and liquid vehicle therein in isotope exchange relation to deplete the liquid vehicle of deuterium while enriching the vapor vehicle with deuterium.

3. An apparatus as set forth in claim 2 wherein said vapor vehicle is ammonia vapor and said liquid vehicle is liquid ammonia.

4. An apparatus as set forth in claim 2 wherein said vapor vehicle is methylamine vapor and said liquid vehicle is liquid methylamine.

5. A process for the production of ammonia and heavy water, said process comprising the steps of
    enriching a flow of water with deuterium in a monothermal isotopic process;
    supplying a first portion of the deuterium-enriched water to a heavy water preparation plant to produce heavy water and hydrogen;
    storing a second portion of the deuterium-enriched water substantially without interruption during the colder half of a year;
    electrolytically dissociating the stored deuterium-enriched water substantially without interruption during the warmer half of a year to form hydrogen;
    storing a portion of the electrolytically-produced hydrogen during said warmer half of a year;
    generating a flow of nitrogen; and
    supplying the flow of nitrogen, the hydrogen from the heavy water preparation plant and the stored hydrogen to a synthesizing plant during said colder half of a year while supplying the flow of nitrogen, the hydrogen from the heavy water preparation plant and the remainder of the electrolytically-produced hydrogen to the synthesizing plant during said warmer half of a year.

6. A process as set forth in claim 1 wherein said monothermal isotopic process includes the steps of passing a deuterium containing vapor vehicle in isotope exchange with the flow of water to enrich the water with deuterium, passing a liquid vehicle in isotope exchange with a synthesis gas mixture to remove deuterium from the synthesis gas mixture while enriching the liquid vehicle with deuterium, and passing the vapor vehicle and liquid vehicle in counter flow isotope exchange relation to deplete the liquid vehicle of deuterium while enriching the vapor vehicle with deuterium.

* * * * *